United States Patent [19]

Bernhoft

[11] 3,958,495

[45] May 25, 1976

[54] AIR-OIL AMPLIFIER

[75] Inventor: Gerald W. Bernhoft, Milwaukee, Wis.

[73] Assignee: Koehring Company, Milwaukee, Wis.

[22] Filed: Sept. 19, 1973

[21] Appl. No.: 398,757

Related U.S. Application Data

[62] Division of Ser. No. 285,543, Aug. 31, 1972, abandoned.

[52] U.S. Cl. .............................. 91/433; 137/625.66; 137/102

[51] Int. Cl.[2] .................... F16K 11/00; G05D 16/06

[58] Field of Search ....... 137/625.6, 596.14, 625.63, 137/596.15, 625.68, 625.69, 625.66, 625.65, 596.18, 102; 251/335 A, 61, 28, 61.3; 91/433, 461

[56] References Cited

UNITED STATES PATENTS

| | | | |
|---|---|---|---|
| 1,800,995 | 4/1931 | Gaunt et al. | 251/335. A X |
| 2,589,019 | 3/1952 | Nevroth | 137/625.6 |
| 2,688,314 | 9/1954 | Holm et al. | 137/625.63 X |
| 2,693,932 | 11/1954 | Richards | 251/335 A X |
| 2,727,691 | 12/1955 | Alyea et al. | 137/625.6 X |
| 3,238,966 | 3/1966 | Howard et al. | 137/625.66 X |
| 3,298,384 | 1/1967 | Payne | 91/433 X |
| 3,319,644 | 5/1967 | Thorburn | 137/85 |
| 3,367,369 | 2/1968 | Wagner | 137/625.66 |
| 3,381,586 | 5/1968 | Rosenberg | 91/461 X |
| 3,415,163 | 12/1968 | Inaba et al. | 137/625.61 X |
| 3,426,784 | 2/1969 | Vick | 137/625.61 X |
| 3,568,718 | 3/1971 | Wilke | 137/625.6 |
| 3,625,246 | 12/1971 | Reaves | 137/625.66 X |
| 3,706,322 | 12/1972 | Carlson | 137/625.66 |
| 3,773,084 | 11/1973 | Bernhoft | 91/434 X |

*Primary Examiner*—Martin P. Schwadron
*Assistant Examiner*—Robert J. Miller
*Attorney, Agent, or Firm*—James E. Nilles

[57] ABSTRACT

An amplifying valve having an axially slidable valve spool to normally communicate a service port with a reservoir port, but which is movable to an operative position by a diaphragm type actuator activatable by air at substantially low but different selected pressures at the command of a pilot valve. In its operative position, the spool communicates the service port with a supply port for oil at high pressure. The pressure of oil at the service port is translated into a force on the spool to counteract that which is imposed thereon by the diaphragm actuator, so that service port pressure will always be substantially greater than but proportional to air pressure on the diaphragm.

1 Claim, 4 Drawing Figures

AIR-OIL AMPLIFIER

This application is a division of my copending application Ser. No. 285,543, filed Aug. 31, 1972, now abandoned.

This invention relates to hydraulic control instrumentalities which are used on such material handling apparatus as backhoes and the like, and it has more particular reference to amplifying valves which are operated by control fluid at selected substantially low pressures in a manually controlled pilot circuit and produce proportionally higher output pressures in another circuit.

A conventional amplifying valve of the type herein concerned and which has been used in control systems for backhoes is disclosed in my copending application Ser. No. 262,024, filed June 12, 1972 now U.S. Pat. No. 3,883,023. It has the usual pilot port to receive air at different substantially low pressures from a manually operated pilot valve, an input port for air at higher pressure, and an output port from which input air issues at a pressure which is three times that of air at the pilot port. The air issuing from the output port is directed into an actuating cylinder connected with the spool of a directional control valve, to effect shifting of the spool to an operating position at which it effects diversion of oil from a pump to one side of a hydraulic cylinder or other fluid motor.

A control system embodying an amplifying valve with an air pressure output for effecting control valve operation at the command of a pilot valve has several disadvantages, among which are the following:

1. excessive noise and friction in the air cylinders by which the directional valve spools are shifted;
2. difficulty of alignment of the air cylinder pistons with the spools of the directional control valves actuated thereby with resulting aggravation of the friction problem;
3. the impossibility of accurately positioning the actuated valve spool, especially at times when the operator finds it necessary to back off on the pilot valve to slow the operation of the controlled motor;
4. the danger of unauthorized operation of the machine governed by the system in the event the system embodies an accumulator.

With these disadvantages in mind, it is the general purpose of this invention to provide an improved amplifying valve for the purpose described, which enables more precise and positive control over the position of the valve spool in the controlled main valve and renders the control system much less noisy.

More specifically, it is an object of the invention to provide an amplifying valve for main valve control operation such as described, featuring a diaphragm actuated valve spool and an oil output at substantially high pressure, to thereby not only relieve the compressor on the machine of considerable effort but to also assure the desired positive and accurate control over the position of the main valve without introducing seal problems such as are encountered with air at high pressures.

Still another object of the invention resides in the provision of a control system including a main directional control valve, and a pilot valve operated amplifying valve for supplying high energy fluid to the actuating cylinder for the main valve, and in which system the problems heretofore arising from friction and sealing of the moving parts in the amplifying valve and actuating cylinder are eliminated.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of the embodiments of the invention constructed according to the best modes so far devised for the practical application of the principles thereof, and in which.

Figure 4:
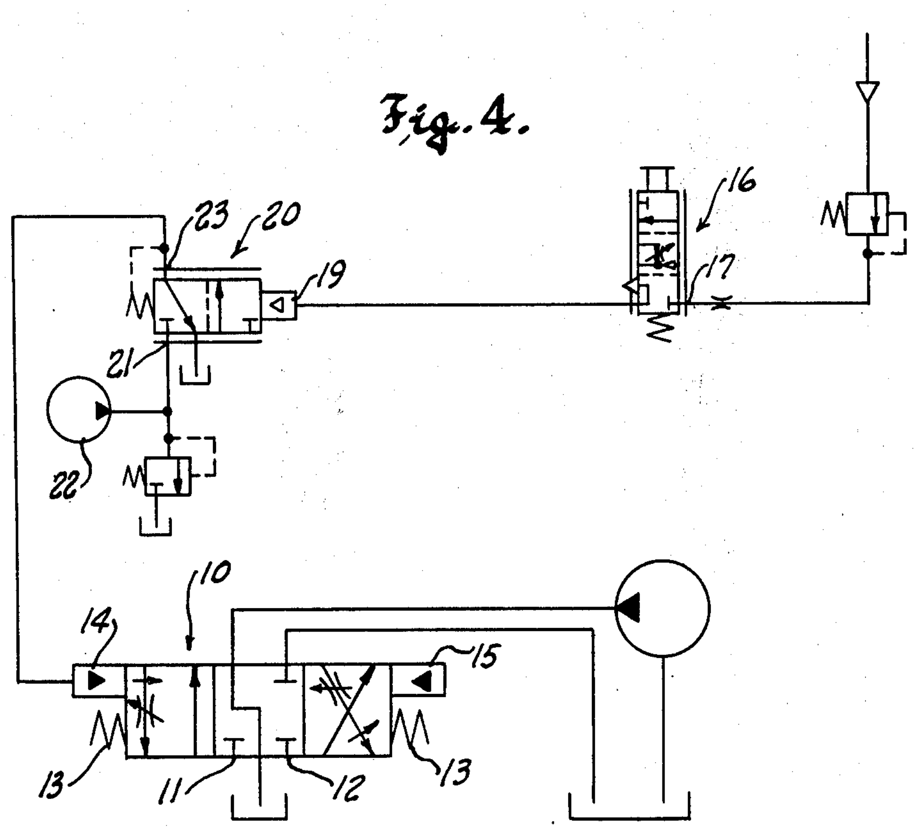
FIG. 4 is a graphic diagram of a control system embodying an amplifying valve of this invention.

Referring now to the accompanying drawings, and especially to the FIG. 4 diagram, the numeral 10 generally designates a directional control valve having service ports 11 and 12 which are connectible with the opposite sides of a double acting hydraulic cylinder or other reversible fluid motor (not shown) to govern the speed and direction of motor operation.

The control valve herein shown is of the pressure compensated type having a valve spool normally held in an open center position by a centering spring assembly here indicated by a pair of springs 13. The spool of the control valve 10 is shifted to operating positions at opposite sides of neutral by hydraulic actuating means here shown as comprising a pair of single acting hydraulic cylinders 14 and 15, it being understood that one double acting hydraulic cylinder ordinarily suffices for that purpose.

The spool of the control valve can be shifted to an operating position to the right of its neutral position shown at the command of a manually actuated pilot valve generally designated 16. The pilot valve has an inlet 17 to receive air under a pressure of about 35 psi from a compressor (not shown), and it is operable to deliver air at said pressure or at any selected lesser pressure value to the pilot port 19 of an amplifying valve 20 of this invention. Such a valve, in which the air delivered is proportional to the degree of valve movement, is described in detail in U.S. Pat. No. 3,773,084, granted Nov. 11, 1973.

The amplifying valve has an inlet 21 which is connected with the output port of a pump 22 to receive oil at substantially high pressure therefrom, and a service port 23 which is connected with the hydraulic actuator 14 to supply oil thereto at a pressure which can be on the order of 25 times the pressure of pilot air at the pilot port 19.

By way of example, if the pilot valve is actuated to produce an output of 20 psi which, of course, is manifested at the pilot inlet port 19 of the amplifying valve, the latter will function to produce an output of about 500 psi for operation of cylinder 14 and actuation of the spool of control valve 10 to an operating position to the right of its neutral position shown. It is to be understood that a duplicate pilot and amplifying valve arrangement would be provided to control operation of the other cylinder 15 on the main control valve 10.

Figure 1:
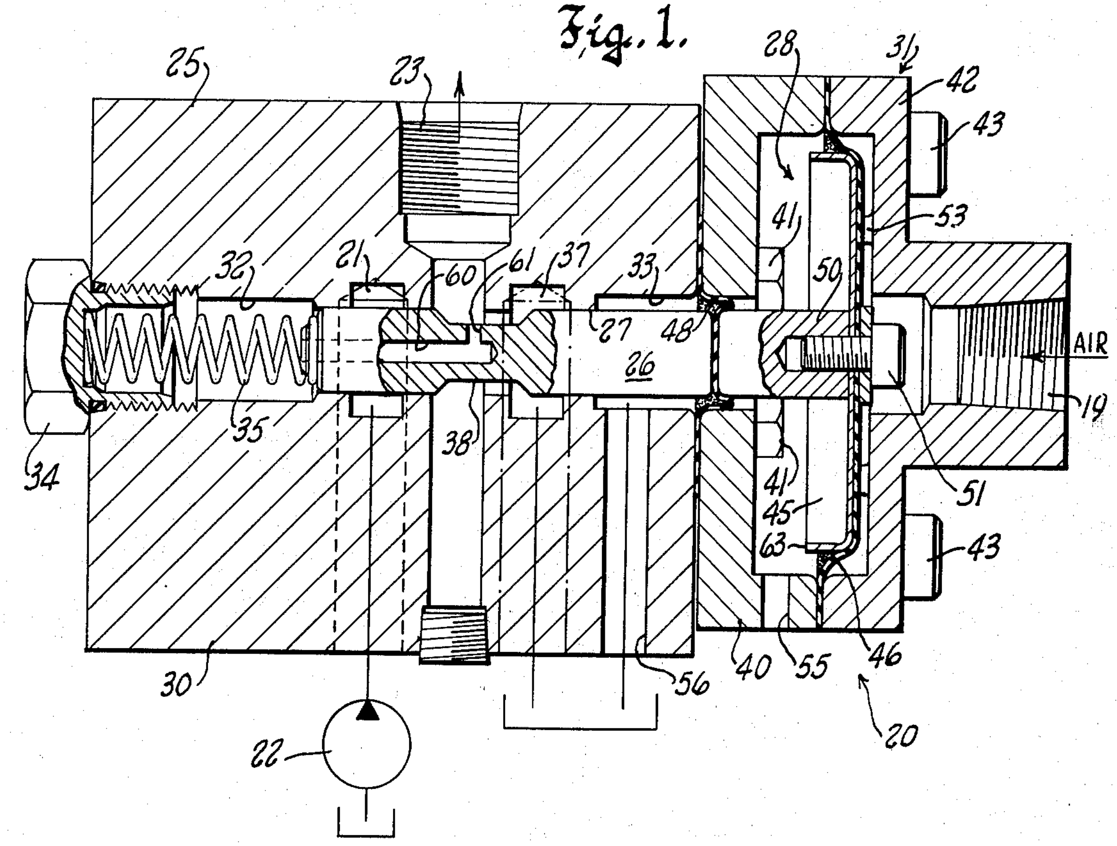
FIG. 1 is a sectional view of an amplifying valve embodying this invention.
Figure 2:
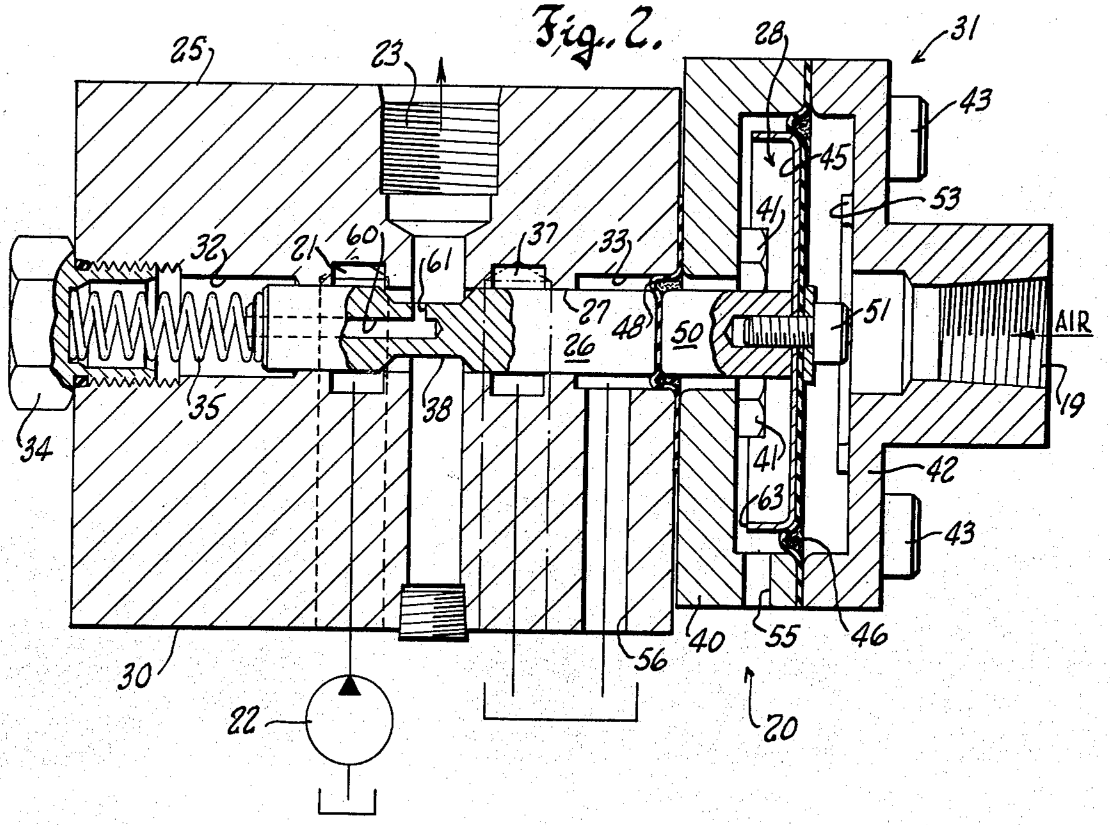
FIG. 2 is a view similar to FIG. 1 but showing the valve in an operating condition.

With reference to FIGS. 1 and 2, it will be seen that the amplifying valve of this invention comprises three main components, namely a body 25, a valve spool 26 slidable axially in a bore 27 in the body, and a diaphragm actuator 28 operatively connected with the spool. The body is comprised of a substantially elongated main or spool housing 30, and a diaphragm housing generally designated 31, secured to one end of the main housing.

The bore 27 in which the valve spool is received extends lengthwise of the body and opens outwardly to the opposite ends thereof through counterbores 32 and 33. A plug 34 threaded into the mouth of the counterbore 32 closes the bore at the end of the body remote from the diaphragm actuator, and the space in counterbore 32 defines a cylinder into which the adjacent end of the spool 26 projects to act as a piston therein. A coiled compression spring 35 in cylinder 32, confined between the plug 34 and the adjacent end of the spool 26, exerts substantial force on the spool to yieldingly hold the same in an inoperative position seen in FIG. 1.

The two ports 21 and 23 open to the bore 27 at axially adjacent zones, with the port 23 interposed between the port 21 and a reservoir or vent port 37. In the arrangement shown, the high pressure inlet port 21 is closest to the cylinder 32 while the vent port 37 opens to the bore at a location adjacent to the counterbore 33.

The valve spool 26 is provided with a circumferential groove 38 in its exterior, so located as to communicate the service and reservoir ports in the normal or inoperative position of the valve spool seen in FIG. 1. In that position, the spool closes off the inlet port from the service port 23, the vent port 37, and the feedback cylinder 32. However, the groove 38 also vents the feedback cylinder 32 to the reservoir port 37. The diaphragm actuator 28 is operable to shift the spool out of its normal position, against the force of spring 35, to an operative position at which its groove 38 communicates the inlet and service ports 21 and 23, respectively. The manner in which pressure of air at the pilot port 19 is translated into movement of the valve spool 26 to an operative position entails an understanding of the structure of the diaphragm housing 31 now about to be described.

The diaphragm housing is of two part construction. It comprises an inner housing member 40 which is secured to the end of the spool housing remote from the plug 34 by screws 41, and an outer housing member or bonnet 42 secured to the inner housing member 40 by screws 43. Each of these housing components can be said to be of cup-like configuration, and they have their open sides facing toward and in register with one another to define a compartment in which the diaphragm actuator 28 operates.

The diaphragm actuator comprises the usual rigid piston 45 and a flexible membrane 46 overlying and secured to the outer side of the piston and having its peripheral portion clamped between the rims of the inner and outer housing members 40 and 42.

A second diaphragm 48 is confined between the inner housing member 40 and the adjacent end of the main housing 30. The diaphragm 48 is like a gasket which extends across the open end of the counterbore 33 and the adjacent end of the valve spool 26 to provide a fluid tight joint between the main and diaphragm housings.

Inward motion of the diaphragm actuator 28 into the interior of the inner housing member 40 takes place in consequence of pressurization of the inlet 19 and interior of the outer housing member 42 by air from the pilot valve. Such inward motion of the diaphragm actuator is translated into leftward motion of the valve spool 26 to an operative position such as seen in FIG. 2, through a stem 50 fixed to the inner side of the piston 45 at its center, by a screw 51. The stem 50 projects inwardly from the actuator, in coaxial relation to the valve spool 26, and bears upon the diaphragm 40 at a location directly opposite the adjacent and of the valve spool. It should be noted that the screw 51 also serves to hold the piston 45 in proper position on the diaphragm 46.

In the construction described, the spring 35 urges the valve spool 26 to the right, against the end of the stem 50 on the diaphragm, and thus also acts on the diaphragm actuator to hold the same in a retracted position in the interior of its housing. This retracted position is defined by the engagement of the outer side of the diaphragm actuator with a substantially annular bead 53 on the inside of the outer housing member 42, as seen best in FIG. 2. The bead is interrupted at a plurality of locations as shown and, of course, it also serves to define the normal position of the valve spool 26.

The interior of the inner housing member 40 is vented to the atmosphere through a hole 55; while the counterbore 33 is vented to the reservoir through a passage 56 in the main housing.

In the operation of the amplifying valve, air under pressure from the pilot valve 16 is directed into the interior of the outer diaphragm housing member 42 through the pilot port 19, to activate the diaphragm actuator and effect actuation of the valve spool 26 to an operating position to the left of its normal position as soon as the force exerted on the spool by the diaphragm exceeds the force exerted on the spool by the spring 35. In this respect, it should be mentioned that the rate of spring 35 is selected so that the force it exerts on the valve spool will be slightly greater than the spring force tending to hold the spool in the main valve in its neutral position. This assures a minimum output pressure at port 23 sufficient to effect actuation of the main valve spool at the command of the pilot valve 16, as soon as the diaphragm force on the spool exceeds the spring force thereon.

The pressure at the output port 23, of the amplifying valve will be proportional to but substantially greater than the pressure of pilot air at the pilot port 19 of the valve. When the operator depresses the control button of the pilot valve 16, for example, to a selected position short of a full operating position, the diaphragm actuator will effect movement of the valve spool 26 in the amplifying valve to an operating position affording communication between the high pressure inlet port 21 and the output port 23, and fluid at high pressure will flow out of port 23 to the actuating cylinder 14 for the main valve 10, to move the same out of its neutral position toward an operating position an extent depending upon the pressure of air at the pilot port 19. When the desired operating position of the main valve spool corresponding to the position of the pilot valve has been reached, the valve spool 26 in the amplifying valve will be moved toward its normal inoperative position to substantially close off further communication between the high pressure inlet port 21 and the output port 23. This new position of the parts is indicated in FIG. 2, where only a very slight trickle of oil may be allowed to pass into the output port 23 from the high pressure inlet 21, to compensate for any leakage in the system.

The valve spool 26 returns to this substantially closed position in consequence of the force exerted thereon by spring 35 augmented by a feedback force which the pressure of output fluid exerts on its left hand end in the cylinder provided by the counterbore 32. For that purpose, the cylinder 32 is communicated with the output port 23 in any suitable fashion, as by an axial passage 60 in the valve spool, opening to the cylinder 32, and a radial passageway 61 connecting with the passage 60 and opening to the circumferential groove 38 in the spool so as to be at all times in communication with the output port 23.

From this it will be understood that with any given pressure at the pilot port 19, the pressure at the output port will be at a substantially higher pressure which is proportional to pilot pressure, while the valve spool in the main valve will be held in any operating position reflecting the magnitude of pilot pressure at port 19 by the balance between return spring force thereon and actuating force exerted thereon by its cylinder 14.

The leftward motion of the valve spool 26 is limited by the engagement of the rim 63 on the piston of the diaphragm actuator 28 with the bottom of the cup-like inner housing member 40 on the diaphragm housing. During movement of the diaphragm actuator toward its inner limit of travel, of course, the inner diaphragm 48 will be rolled along the exterior of the diaphragm stem 50 and into the counterbore 33. It is to be understood, of course, that the inner diaphragm 48 will have sufficient free material at its central portion to enable it to roll back and forth along the exterior of the stem 50.

It is believed to be apparent that, if desired, the stem 50 can be secured to the adjacent axial end of the valve spool 26 by a longer screw 51, in which case the diaphragm actuator would become part of a subassembly including the valve spool 26.

Figure 3:
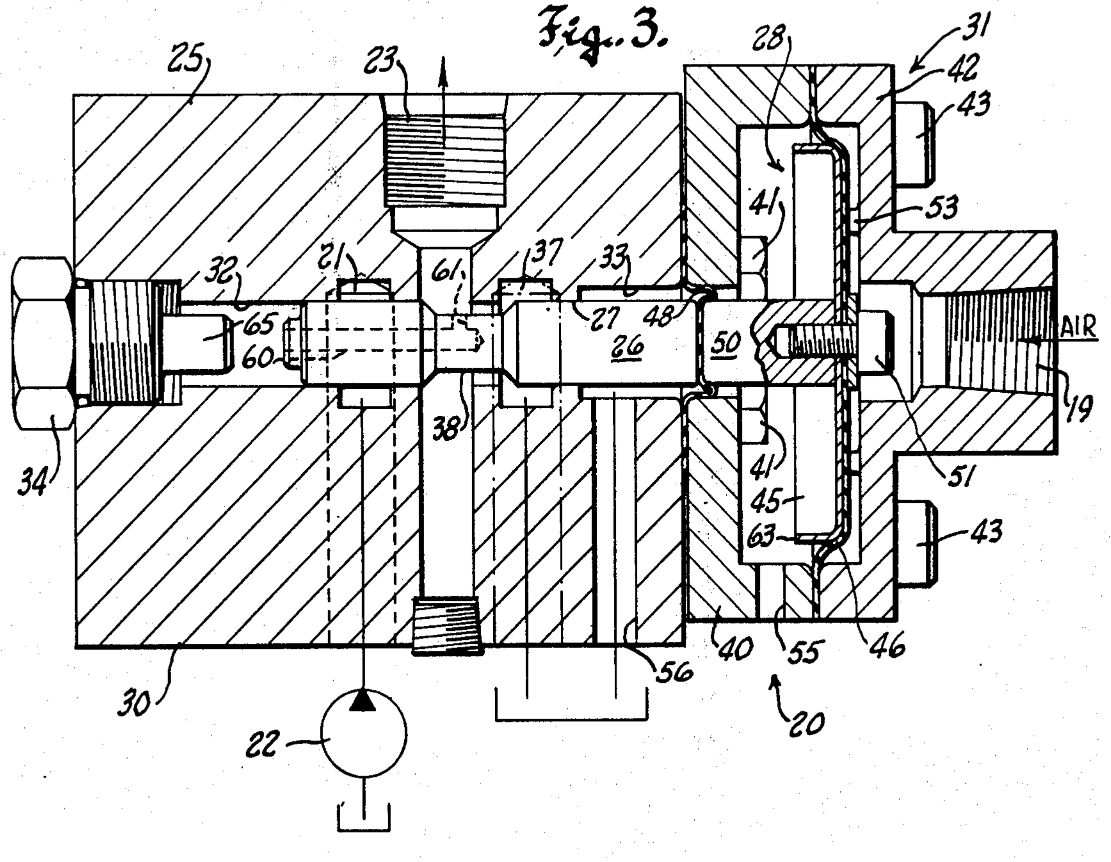
FIG. 3 is a sectional view similar to FIG. 1 but illustrating a slightly modified embodiment of the invention.

In cases where the amplifying valve need not have as high an amplifying factor as the 25 to one ratio mentioned earlier, it is possible to construct the valve in the manner seen in FIG. 3. The amplifying valve featured in FIG. 3 is like that previously described, except that the valve spring has been eliminated, and the plug 34 is provided with a stop 65 on its inner end, to limit leftward travel of the valve spool 26 to its operative position.

From the foregoing description, together with the accompanying drawings, it will be readily apparent that this invention provides an amplifying valve having a desirably high amplifying factor for positive and precise oil pressure actuation of directional control valves at the dictate of an air pressure pilot.

Those skilled in the art will appreciate that the invention can be embodied in forms other than as herein disclosed for purposes of illustration.

The invention is defined by the following claims:

1. In a hydraulic system, the combination of: a hydraulic motor, a variably positionable control valve having a fluid actuating chamber and adapted to control flow to said hydraulic motor in relation to the pressure developed in said chamber; means providing a source of pilot air pressure at selectable pressures in a first range; means providing a source of oil; an amplifier means having a housing forming a bore therein, a valve spool slideable in said bore, said housing having an outlet port communicating with said actuating chamber of said control valve, first and second inlet ports respectively connected with said source of pilot air pressure and said source of oil, said spool forming first and second chambers in said bore at opposite ends of said valve spool, means including an axial passage in said spool continuously communicating said second chamber with said outlet port, said spool forming a first pressure responsive surface subject to the pressure at said outlet port communicated through said axial passage to urge said spool in one direction, said valve spool forming a second presssure responsive surface in said first chamber, said second pressure responsive surface being larger than said first pressure responsive surface, said first chamber being in communication with said source of pilot air pressure at selectable pressures for urging said spool in a direction to communicate said inlet port to said actuating chamber to supply oil from said source of oil to said actuating chamber at a pressure in a second range, the pressures in said second range being substantially higher than the pressure in said first range and in direct proportion to the latter for all positions of said spool.

* * * * *